Figure 1:
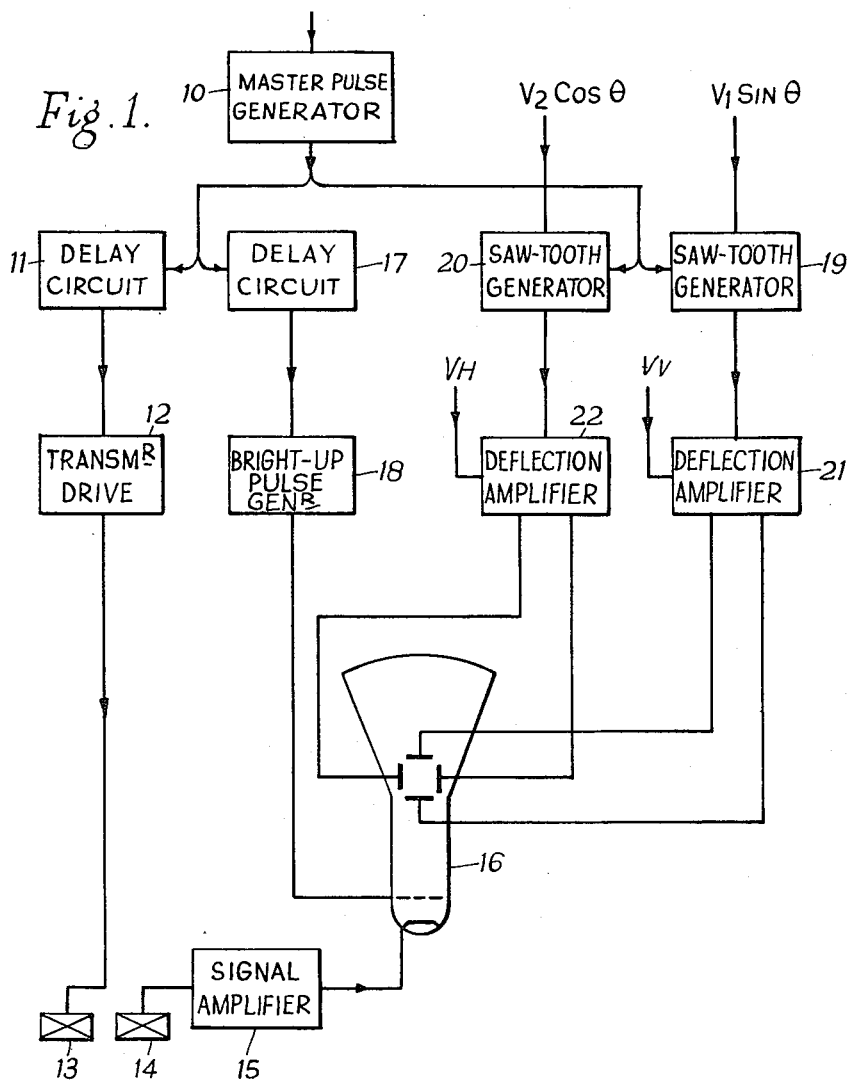

INVENTOR
THOMAS G. BROWN 3,086,390
EXAMINATION BY ULTRASONICS OF BODIES HAVING A NON-PLANAR SURFACE
Thomas G. Brown, Hillington, Glasgow, Scotland, assignor to S. Smith & Sons (England) Limited, London, England, a British company
Filed Apr. 27, 1959, Ser. No. 809,136
Claims priority, application Great Britain Apr. 28, 1958
6 Claims. (Cl. 73—67.8)

The present invention relates to the examination by ultrasonics of bodies having a non-planar surface. An example is the examination of internal organs of a human body as a diagnostic aid in medical and surgical practice. Such organs, in general, have non-planar surfaces.

Hitherto one method of examining a human body has used an A-scope display, that is a display in which echoes are represented as vertical "blips" on a horizontal linear time-base. Whilst this display gives good amplitude and time resolution, it gives no indication of the position of the test probe on the patient. Since the human body is a very complex structure a large number of echoes are normally received and a very slight change of probe position is sufficient to alter the echo pattern completely. Thus, it is very difficult to identify particular reflecting surfaces, except in the simplest cases. It is conceivable that if the probe position and inclination were measured and a photograph or other record taken of the echo pattern in each of a number of positions, it would be possible to plot the position of consistent echoes and so extract some additional information, but the process would be a very tedious one.

Two other methods culled from radar practice have also been used, namely those using the B-scope display and those using plan-position-indicator (P.P.I.) display. In the former a probe consisting of closely adjacent transmitting and receiving transducers or a common transmitting/receiving transducer is moved along a line at right angles to the mean direction of propagation of the ultrasonic waves. The indicator, such as a cathode ray beam, is deflected by a linear time base waveform locked to the transmitted pulses from an origin which itself is deflected at right angles to the sweep direction in dependence upon the position of the probe along the said line and the beam is intensity-modulated by the received echoes. The display is built up either on a long-persistence screen or upon a photographic plate.

In the P.P.I. display, the probe is rotated about a fixed point within or outside the area to be examined. The cathode ray beam is deflected radially from an origin either upon the screen or outside the screen (sector scan) by means of a time base waveform locked to the transmitted pulses, the direction of deflection is varied in dependence upon the angular position of the probe, and the cathode ray beam is intensity-modulated with the echo signals.

Neither of these methods using either B-scope or P.P.I. presentation is capable of producing satisfactory echo patterns of the deep-seated organs of the body, for the following reasons. At the frequency in use (usually about 2½ mc./s.), smooth surfaces of more than a few millimetres in diameter tend to produce specular reflection of ultrasonic energy. Thus, if the transmitting and receiving transducers are close together or common, echoes will be detected by the receiver only if the incident energy beam is close to the normal to the interface from which they originate. For other angles of incidence energy will still be reflected, but not towards the receiving transducer. Thus, with methods using the B-scope or the P.P.I. presentation there is little chance of plotting a continuous outline of a curved surface such as a cyst, especially when the surface has its convex side towards the probe.

The present invention has for its object to provide improved means for the examination of non-planar surfaces within bodies with which the interpretation of results is made easier than with the methods hereinbefore referred to.

According to the present invention there is provided apparatus for the examination by ultrasonics of non-planar surfaces located within a body, the apparatus comprising a transducer means for emitting and receiving ultrasonic waves adapted to be moved in a plane over the outer surface of the body with its wave-emitting and receiving surface in contact with the said outer surface, the transducer means being either itself mounted for angular movement about an axis or having control means for producing angular movement of the direction of emission and reception of the waves about an axis, means for deflecting an indicator over a screen in a straight line from an origin, means for controlling the direction of the said line about the origin in dependence upon the direction of emission and reception of the waves, means for controlling the position of said origin in dependence upon the movements of the said axis, and means for modulating the indicator or rendering it operative and inoperative in dependence upon echo signals received by the transducer means, the arrangement being such that echoes from a given site within the body under examination produce on the screen markings in approximately the same position over a substantial range of movement of the said transducer means in the said plane. The angular movement of the direction of wave emission and reception is preferably in the said plane.

The indicator is conveniently a cathode ray beam modulated by the received echo signals. It may, however, be a mechanical indicator, such for example as a pen which is caused by a received echo signal to contact, and produce a mark upon, a recording surface.

Figure 2:
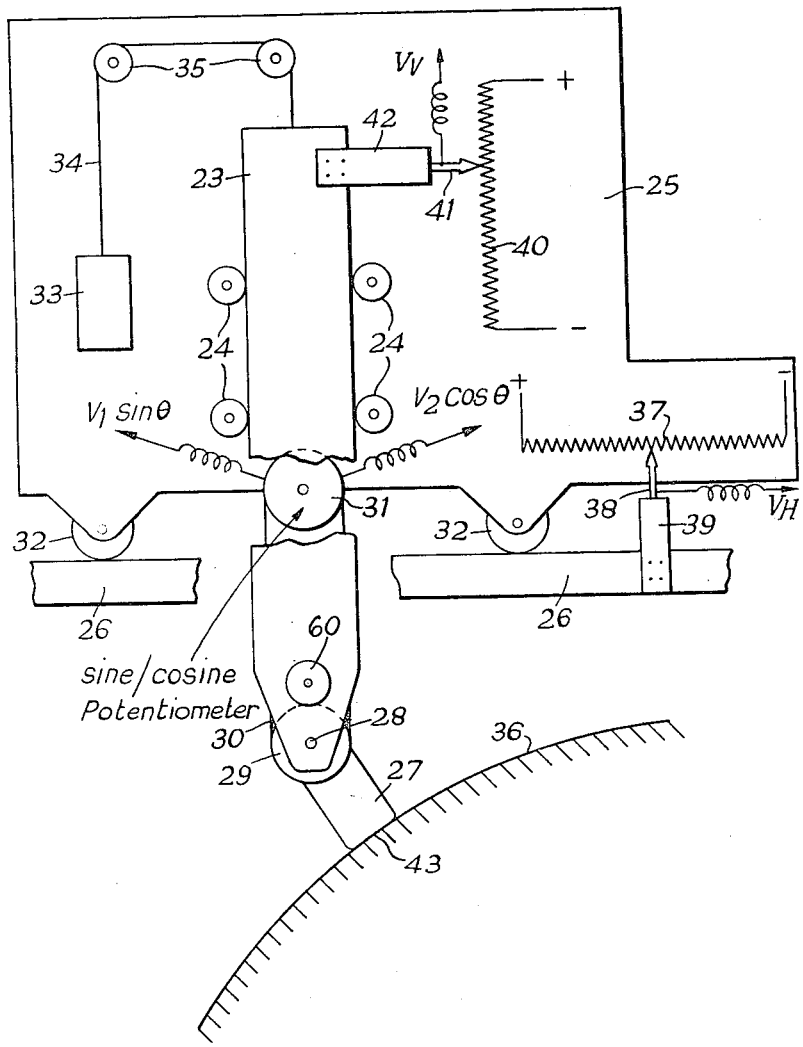
Figure 3:
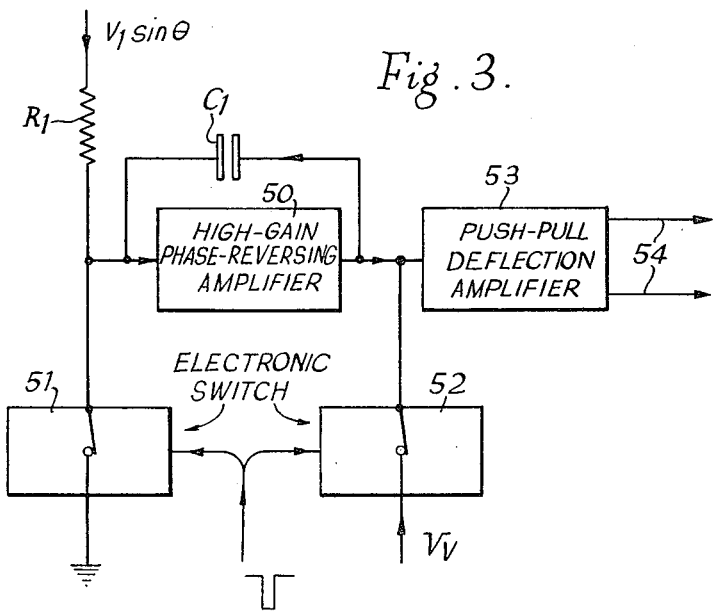
Figure 4:
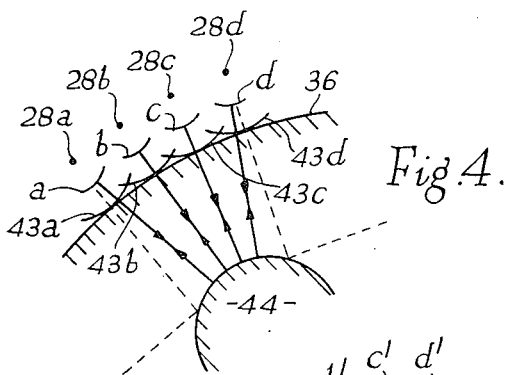
Figure 5:
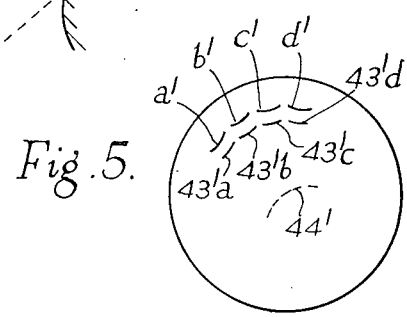

One embodiment of the invention suitable for use in examining a human body will be described by way of example, reference being made to the accompanying drawings in which FIG. 1 shows a circuit diagram of the embodiment, FIG. 2 is a diagrammatic view showing one form that part of the embodiment of FIG. 1 may take, FIG. 3 is a circuit diagram of a modification of one of the saw-tooth generators and deflection amplifiers of FIG. 1, FIG. 4 is a diagram illustrating the operation of the invention, and FIG. 5 shows the form of display that may be obtained under the conditions represented in FIG. 4.

Referring first to FIG. 2, a probe support 23 is mounted so as to be slidable vertically between rollers 24 upon a carriage 25 adapted to slide on rollers 32 along horizontal guide rails 26 which can be supported over a bed upon which a patient to be examined lies. The probe support 23 carries a probe assembly 27 which may be either a single probe acting as transmitter/receiver, or two separate probes. The probe, or each probe, is provided, in the usual way, with a transducer in the form of a piezo-electric crystal. An assembly including two separate probes will be assumed to be used. The probe assembly 27 is mounted for limited rocking movement, for example through ±110° from the vertically downward direction, about an axis 28 and is fixed to a pulley wheel 29 coupled by a cord 30 to a second pulley wheel 31 constituting the movable element of a sine/cosine potentiometer. The pulley wheels 29 and 31 are rotatably mounted on the probe support 23 to which the fixed element (not shown) of the sine/cosine potentiometer is fixed. The weight of the probe support 23 is approximately balanced by a counterweight 33 coupled to the support 23 by a cord 34 running over pulleys 35. The horizontal movement of the carriage 25 and the vertical movement of the support 23 in the carriage permit the energy-emitting and receiving face of the probe assembly 27 to be moved over the surface 36 of the patient's body in contact with the skin in a plane in which an examination is to be made. Normally, of course, the examination will be repeated in a number of such planes and for this purpose the guide rails 26 are made movable in a direction perpendicular to the plane of the paper. While the probe assembly 27 is being moved as described, it is rocked to and fro about its axis 28. It will be assumed that this rocking is effected manually, although of course means may be provided for effecting it automatically as for example by a suitable servo motor indicated schematically at 60.

Means are provided for generating voltages $V_H$ and $V_V$ representative respectively of the horizontal and vertical positions in space of the rocking axis of the probe assembly and also for generating voltages representative of the instantaneous angular position of the probe assembly about its axis. For generating the voltage $V_H$ there is shown a potentiometer 37 fixedly mounted on the carriage 25 and having a suitable voltage applied between its end terminals. The wiper 38 of this potentiometer is shown as fixed to an insulating support 39 fixed to the rail 26. The voltage $V_V$ is shown as generated by means of a second potentiometer 40 also fixed to the carriage 25 and having its wiper 41 mounted on an insulating support 42 fixed to the probe support 23. The voltages representative of angular position of the probe assembly about its axis 28 are generated by the sine/cosine potentiometer 31 giving voltages $V_1 \sin \theta$ and $V_2 \cos \theta$, where $\theta$ is the angle made to the horizontal by the normal to the energy-emitting and receiving faces 43 of the probes.

Referring now to FIG. 1, a master pulse generator 10 applies pulses, for example each of 500 microseconds' duration, through a delay circuit 11 (the purpose of which will be described later) to a transmitter drive 12 which generates a short pulse (of duration much less than 500 microseconds) of ultrasonic energy whenever a pulse is fed thereto from 11. This ultrasonic pulse is applied to a transmitting transducer 13 forming part of the probe assembly 27 of FIG. 2. Echoes received by a receiving transducer 14 forming another part of the assembly 27 are fed to a signal amplifier and other circuitry represented at 15 the output of which is applied in a negative-going sense to the cathode of a cathode ray tube 16. The pulses from the generator 10 are also applied through a delay circuit 17 to a bright-up pulse generator 18 which generates positive-going pulses which are applied to the control grid of the cathode ray tube. The relative time delays introduced by the circuits 11 and 17 are such that the tube 16 is rendered operative just before a pulse is transmitted. The bright-up pulses from 18 act as gating pulses to maintain the tube 16 responsive for a suitable time to echo signals applied to its cathode.

Pulses from the generator 10 are also applied to two saw-tooth generators 19 and 20 each of which is a Miller integrator associated with an electronic switch. Each pulse opens the electronic switch and when this occurs the circuit commences to integrate a voltage applied thereto. In the case of the circuit 19 this voltage is $V_1 \sin \theta$ derived from the sine/cosine potentiometer 31 of FIG. 2, and in the case of the circuit 20 it is $V_2 \cos \theta$ derived from the same potentiometer device. Thus the circuits 19 and 20 generate saw-tooth waveforms whose slope is proportional to the instantaneous value of $V_1 \sin \theta$ or $V_2 \cos \theta$ as the case may be. Alternatively, as will be described with reference to FIG. 3, the Miller integrators 19 and 20 may be arranged to start their integrations of the outputs of the sine/cosine potentiometer from voltage levels set by the linear shift potentiometers, that is by the voltages $V_V$ and $V_H$.

The saw-tooth from 19 is fed together with the voltage $V_V$ to a deflection amplifier 21 whose output is coupled to the Y-deflection plates of the tube 16. The saw-tooth from 20 is fed together with the voltage $V_H$ to a deflection amplifier 22 whose output is coupled to the X-deflection plates of the tube.

FIG. 3 shows an alternative form that the saw-tooth generator 19 and deflection amplifier 21 of FIG. 1 may take. The voltage $V_1 \sin \theta$ is applied through a resistor $R_1$ to the input of a high-gain phase-reversing amplifier 50 having its output coupled to its input by a capacitor $C_1$. An electronic switch 51 normally connects the input of the amplifier 50 to earth and a second electronic switch 52 normally connects the output of the amplifier to a fixed voltage point $V_V$. When a negative-going pulse is applied from the generator 10 of FIG. 1 to the two switches 51 and 52, these open and the capacitor $C_1$ begins to charge at a rate $-V_1 \sin \theta / C_1 R_1$ volts per second from the value $V_V$. The output of the integrator formed by the amplifier 50 and capacitor $C_1$ is amplified in a push-pull amplifier 53 and the outputs 54 connected to the Y-plates of the cathode ray tube 16 of FIG. 1 respectively.

If a positive rate of change of voltage is required $V_1$ is made negative. In practice the integrator is made capable of working in both directions since the sign of $\sin \theta$ can be either positive or negative.

The parts 20, 22 in FIG. 1 may be replaced by the same circuit as is shown in FIG. 3 with the exception that the gain of the amplifier 53 must be adapted to the sensitivity of the deflection system. Magnetic deflecting means may, of course, be provided for the tube 16 instead of the electrostatic means shown and the deflecting current fed to the deflecting coils is, in known manner made proportional to the voltage inputs.

When using the circuit of FIG. 1 alone or modified as shown in FIG. 3, the cathode ray beam is deflected in a sector scan from an origin and received echoes are displayed at a distance from the origin dependent upon the depth of the echo source. In the absence of the delay circuit 11, the origin would represent the position of the energy-emitting face of the transducer 13. By suitably choosing the delay introduced by the circuit 11 it can be arranged that the origin represents the position of the axis about which the probe rocks. The position of the origin is in this way unaffected by the rocking of the probe.

This will be better understood from FIG. 4 in which 36 represents, as before, the external surface of the patient's body. An internal organ is indicated at 44. The arcs 43a, 43b, 43c and 43d represent the paths swept by the face 43 (FIG. 2) of the probe assembly as it is rocked in four different positions on the body. The paths of the energy-emitting face of the transducer are indicated at a, b, c and d, and the consecutive positions of the axis 28 of the probe assembly are indicated at 28a, 28b, 28c and 28d. The paths of useful ultrasonic waves, that is those impinging normally on the surface of the organ 44, are indicated in full lines and useless waves, that is waves that do not impinge normally and therefore are not reflected back to the probe asembly, are indicated in dotted lines.

FIG. 5 shows the display obtainable, regions of the display having the same references as corresponding regions in FIG. 4 but with a dash superscript. The surface of the organ 44 of FIG. 4 is indicated in FIG. 5 at 44'.

By suitably adjusting the relative values of the voltages $V_1$, $V_2$, $V_V$ and $V_H$, and the delays introduced by 11 and 17, it can be arranged that echoes from different parts of the surface of the organ 44 give rise to marks on the screen which are in approximately correct relation to one another in spite of the movement of the probe axis and of the changes in position of the probe around its axis.

If the delay device 17 is suitably calibrated, it can be used as a range-measuring device for the visual assessment of the size of structures inside the body.

In use, the probe may be rocked to and fro through an angle of about ±20° from a mean position in which the working face is flat upon the skin and the probe is gradually moved over the skin from one side of the body to the other. One such complete traverse may take one-and-a-half to two-and-a-half minutes and in order that the whole presentation may be viewed at one time it may be photographed upon a photographic film. In FIGURE 2 it will be seen that probe or transducer 27 is rocked about axis 28 whatever the position of axis 28 may be relative to the surface 43. Accordingly, when axis 28 is moved from the extreme right to the extreme left position with probe 27 being rocked in all positions, it is necessary that an overall rotation of ±110° be obtainable about axis 28 by the probe 27. Assuming the surface section 36 shown in FIGURE 2 is a quadrant, the probe 27 must rotate 90°+20°=110° for each side of the body, making ±110° for the two quadrants comprising the semi-circular body section being examined in a prone position on a suitable table. Probe 27 should be mounted so as to rotate through a total arc extending 20° on both sides of a horizontal line through axis 28. Alternatively there may be used on the screen of the tube 16 a recently-introduced phosphor capable of storing a picture in latent form until it is made visible by irradiation with infra-red light.

The transducers 13 and 14 may be of barium titanate measuring 10 x 7 mm. arranged with their 7 mm. sides adjacent. For an ultrasonic frequency of 2.5 mc./s. the thickness of the piezo-electric crystal transducer is about 1 mm. The crystals may be mounted upon probes of polymethyl methacrylate marketed under the name "Perspex" about 25 mm. long of the same cross-sectional dimensions as the crystals. The outer 7 mm. edges of the "Perspex" are rounded to avoid discomfort to the patient.

The invention is, of course, not limited to examinations of the human body but may be used for other purposes, for instance for industrial purposes. It may not always be possible or convenient to rock the probe assembly itself about an axis and, instead, the probe assembly may be fixed and may be of the known variable-angle type with which the angle at which the waves are transmitted and received can be varied. In this case instead of moving the probe assembly about the axis 28 in FIG. 2 the adjusting means of the probe is so moved that the emitted and received beam is moved about the same axis.

With variable-angle probes the energy transfer increases with increasing angle of incidence but this can be corrected, if desired automatically, by producing suitable variations in the gain for instance of the amplifier 15 in FIG. 1 with change of angle.

Certain further details of the apparatus herein described are set forth in an article published in "The Lancet," June 7, 1958, pages 1188 to 1195.

While there have been described above what are presently believed to be the preferred forms of the invention, variations therof will be obvious to those skilled in the art, and all such changes and variations which fall within the spirit of the invention are intended to be covered by the generic terms in the appended claims, which are variably worded to that end.

I claim:

1. Apparatus for the examination by ultrasonics of non-planar surfaces located within a body the apparatus comprising a transducer means for emitting and receiving ultrasonic waves through a surface thereof, means supporting said transducer means for movement in a plane over the outer surface of said body with said surface of said transducer means in contact with said outer surface, means for varying the effective resultant direction of said emission and reception angularly about an axis, a display screen, indication producing means producing an indication on said screen, deflecting means coupled to said indication-producing means for moving said indication along a path which is substantially circumferential to an origin and at least in part circular, means coupling said direction-varying means to said deflecting means to vary the direction of said indication from said origin in dependence upon the direction of emission and reception of said waves, means coupling said supporting means to said deflecting means to vary the position of said origin in dependence upon movements of said transducer means in said plane, and means coupling said transducer means to said indication-producing means to activate said indication-producing means in dependence upon waves received by said transducer means.

2. Apparatus according to claim 1, wherein said axis is substantially perpendicular to said plane.

3. Apparatus according to claim 1, comprising a master pulse generator, an ultrasonic wave generator, means coupling said wave generator to said transducer means, a saw-tooth generator, means coupling said master pulse generator to said saw-tooth generator to trigger said saw-tooth generator, means coupling the output of said saw-tooth generator to said deflecting means, means coupling said master pulse generator to said ultrasonic wave generator to control the output of waves from said wave generator and delay means in the last named coupling means, whereby said origin is spatially related to said indication to represent said axis.

4. Apparatus for the examination by ultrasonics of non-planar surfaces located within a body, the apparatus comprising a transducer means for emitting and receiving ultrasonic waves through a surface thereof, means supporting said transducer means for movement in a plane over the outer surface of said body with said surface of said transducer means in contact with said outer surface, means for varying the direction of said emission and reception angularly about an axis, a cathode ray tube, said tube having a display screen, cathode ray beam producing means, means for controlling the intensity of said beam, and means for deflecting said cathode ray beam over said screen in a straight line from an origin, means coupling said direction-varying means to said deflecting means to vary the direction of said line in dependence upon the direction of emission and reception of said waves, means coupling said supporting means to said deflecting means to vary the position of said origin in dependence upon movements of said transducer means in said plane, and means coupling said transducer means to said beam intensity control means to apply waves received by said transducer means to bright-up said beam.

5. An ultrasonic diagnostic device for examination of the internal organs of the human body comprising in combination, transducer means for emitting and receiving ultrasonic waves, means mounting said transducer means for controlled movement over the curved resilient outer surface of the human body in a direction determined by a selected pair of scanning coordinates while maintaining its wave emitting and receiving surface in contact with said outer surface, means for producing effective resultant defletcion of the direction of emission and reception about a selected axis with respect to said body under examination for different positions of said transducer means in accordance with said scanning coordinates, so as to intersect the body under examination at different positions in accordance with said scanning coordinates, means connected to said transducer means for producing electric waves of ultrasonic frequency, picture display means for displaying elemental picture areas according to said pair of scanning coordinates to produce a picture of a selected portion of a human body under inspection, variable control voltage means connected to said display means and synchronized with the position of said transducer means in accordance with said pair of coordinates and with the effective resultant deflection of the direction of emission and reception about said selected axis for producing positioning voltages to position said elemental picture elements on said display means in accordance with said pair of coordinates, means connected to said transducer means for energizing said display means for producing thereon said elemental picture areas in response to echoes from a body under inspection by said transducer means whereby to produce a pictorial representation in depth of a portion of a human body under inspection.

6. The combination set forth in claim 5, said wave producing means providing pulsed waves, said display means being a cathode ray tube, said control voltage means being constructed to initiate at least one of said control voltages at a time corresponding to the production of said electronic pulse, delay means connected to provide a delay between said electric pulses and said ultrasonic pulses to compensate for the distance between said selected axis of said effective resultant deflection and said resilient outer surface of a body under inspection.

References Cited in the file of this patent

UNITED STATES PATENTS

| | | |
|---|---|---|
| 2,763,153 | Simjian | Sept. 18, 1956 |
| 3,023,611 | Howry | Mar. 6, 1962 |

FOREIGN PATENTS

| | | |
|---|---|---|
| 696,920 | Great Britain | Sept. 9, 1953 |
| 699,796 | Great Britain | Nov. 18, 1953 |

OTHER REFERENCES

Publication, Wireless World, September 1954 issue, pages 448–450.